(12) United States Patent
Takeda et al.

(10) Patent No.: US 9,784,977 B2
(45) Date of Patent: Oct. 10, 2017

(54) LIGHT GUIDE APPARATUS AND VIRTUAL IMAGE DISPLAY APPARATUS

(71) Applicant: SEIKO EPSON CORPORATION, Tokyo (JP)

(72) Inventors: Takashi Takeda, Suwa (JP); Takahiro Totani, Suwa (JP); Masayuki Takagi, Matsumoto (JP); Toshiaki Miyao, Matsumoto (JP); Akira Komatsu, Tatsuno-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/174,034

(22) Filed: Jun. 6, 2016

(65) Prior Publication Data
US 2017/0052375 A1     Feb. 23, 2017

(30) Foreign Application Priority Data

Aug. 20, 2015  (JP) ................ 2015-162513

(51) Int. Cl.
| | |
|---|---|
| *G02B 27/14* | (2006.01) |
| *G09G 5/00* | (2006.01) |
| *G02B 27/01* | (2006.01) |
| *G02B 17/00* | (2006.01) |
| *F21V 8/00* | (2006.01) |
| *G02B 3/08* | (2006.01) |
| *G02B 27/30* | (2006.01) |

(52) U.S. Cl.
CPC .......... *G02B 27/0172* (2013.01); *G02B 3/08* (2013.01); *G02B 6/0031* (2013.01); *G02B 6/0053* (2013.01); *G02B 6/0055* (2013.01); *G02B 17/006* (2013.01); *G02B 17/008* (2013.01); *G02B 27/30* (2013.01); *G02B 2027/0116* (2013.01)

(58) Field of Classification Search
CPC .... G02B 27/0172; G02B 5/09; G02B 6/0031; G02B 6/0053; G02B 6/0055; G02B 17/006; G02B 27/30; G02B 2027/0116
USPC ................. 359/629, 630, 633; 345/7, 8
See application file for complete search history.

(56) References Cited

U.S. PATENT DOCUMENTS 6,671,100 B1 * 12/2003 McRuer ............ G02B 27/0081
                                                     359/630
9,529,196 B1 * 12/2016 Sade .................. G02B 27/0172

FOREIGN PATENT DOCUMENTS

| JP | 2003-520984 A | 7/2003 |
| WO | 01/27685 A2 | 4/2001 |

* cited by examiner

*Primary Examiner* — William Choi
(74) *Attorney, Agent, or Firm* — Oliff PLC

(57) ABSTRACT

Providing an image extraction section with a plurality of video light reflection surfaces that are Fresnel-shaped reflection surfaces allows reduction in the thickness of a light guide apparatus and hence the thickness and size of a virtual image display apparatus. In particular, providing a dispersion elimination section for eliminating wavelength dispersion in correspondence with the image extraction section suppresses image deterioration resulting from dispersion (chromatic aberrations) on a wavelength band basis.

20 Claims, 11 Drawing Sheets

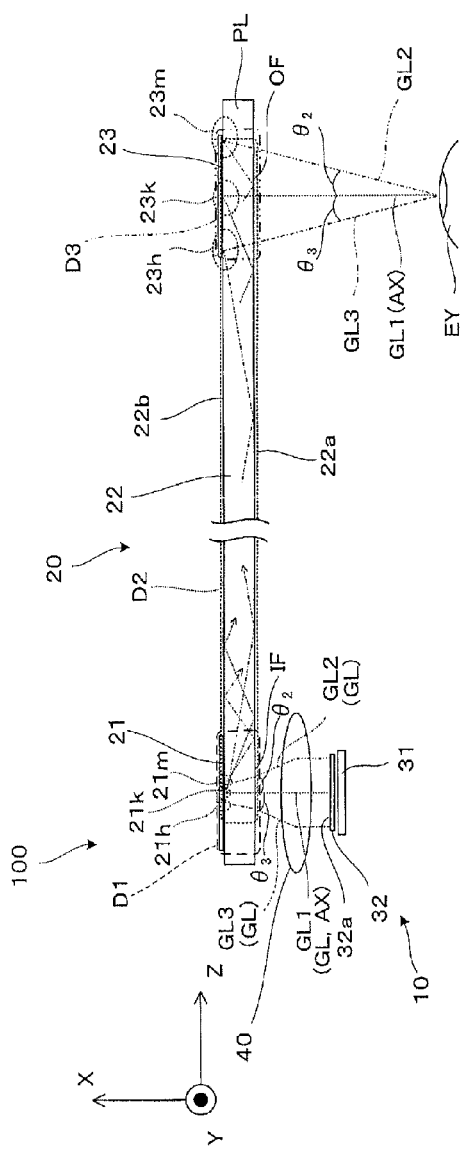
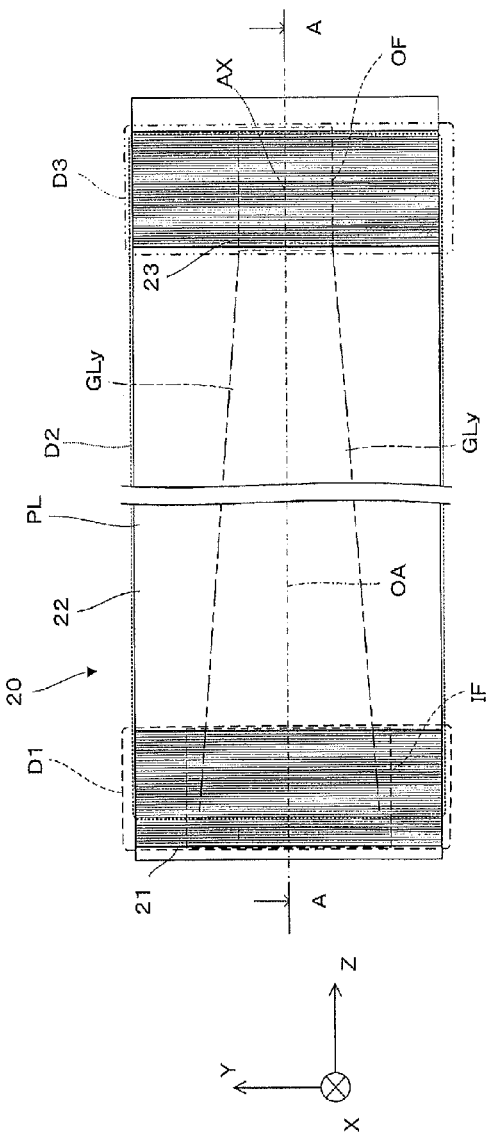
FIG. 1A
FIG. 1B

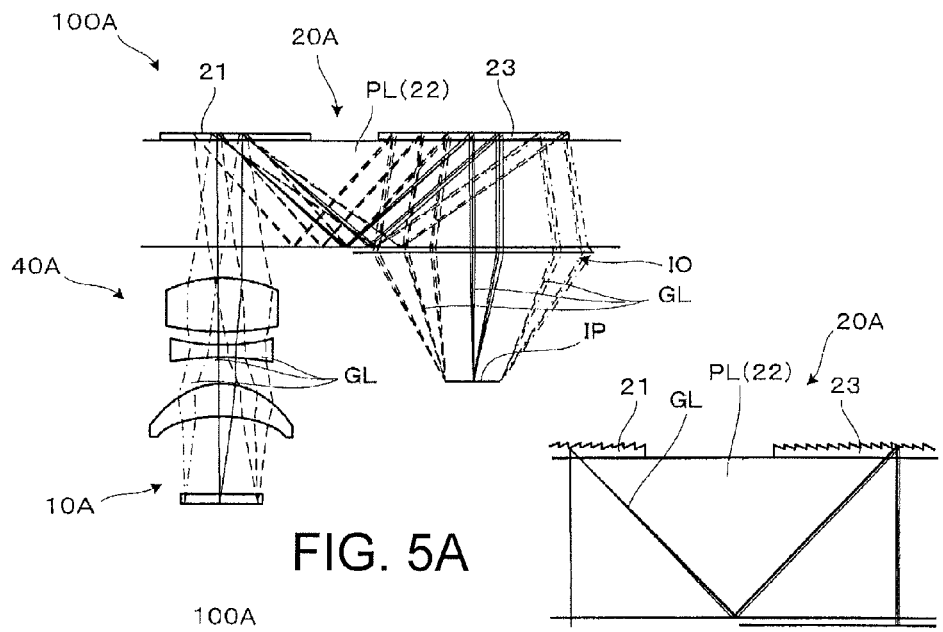
FIG. 5A
FIG. 5B
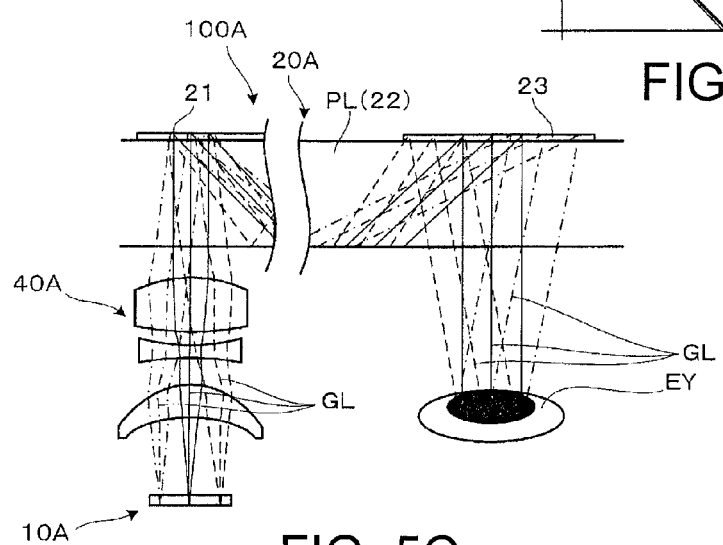
FIG. 5C
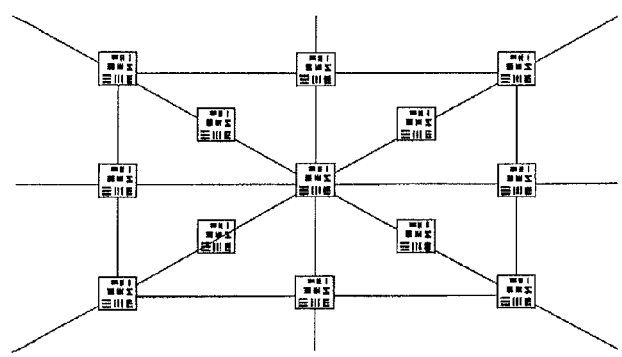
FIG. 5D

LIGHT GUIDE APPARATUS AND VIRTUAL IMAGE DISPLAY APPARATUS

BACKGROUND

1. Technical Field

The present invention relates to a light guide apparatus that can be used in a virtual image display apparatus that presents a viewer with video images formed, for example, by an image display apparatus and further relates to a virtual image display apparatus using the light guide apparatus.

2. Related Art

A variety of optical systems have been proposed as a video light guiding optical system incorporated into a virtual image display apparatus, such as a head mounted display (hereinafter also referred to as HMD) mounted on a viewer's head (see JP-T-2003-520984, the term "JP-T" as used herein means a published Japanese translation of a PCT patent application).

As a virtual image display apparatus of this type or a light guide apparatus suitable for the virtual image display apparatus, for example, there is a known apparatus using a reflection member having the shape of a Fresnel lens (the shape is hereinafter referred to as a Fresnel shape) formed by arranging, along a flat surface, a plurality of prism-shaped members each having a small flat reflection surface (see JP-T-2003-520984).

An HMD and other virtual image display apparatus are required to be further reduced in size with the optical accuracy maintained. To this end, using a Fresnel-shaped member, such as the member described above, to guide light allows reduction in the thickness of a light guide optical system and hence reduction in the size of an apparatus. However, when light passes through such a Fresnel-shaped member (see FIGS. 7A to 9 of JP-T-2003-520984, for example), for example, the light is dispersed due to the difference in refractive index between the member and an air layer or between the member and another member bonded thereto, possibly resulting in image deterioration.

SUMMARY

An advantage of some aspects of the invention is to provide a thin light guide apparatus capable of suppressing image deterioration resulting from dispersion (chromatic aberrations) on a wavelength band basis and guiding the resultant high-quality video light and further provide a virtual image display apparatus using the light guide apparatus.

A light guide apparatus according to an aspect of the invention includes a light incident section on which video light is incident, a light guide section that has reflection surfaces facing each other and extending in parallel to each other and reflects and guides the video light acquired through the light incident section, a light exiting section that causes the video light guided by the light guide section to exit, an image extraction section that is provided on the light exiting section and includes Fresnel-shaped reflection surfaces that deflect the video light from the light guide section to extract the video light out of the apparatus, and a dispersion elimination section that is provided in correspondence with the image extraction section and eliminates wavelength dispersion that occurs in the image extraction section. The phrase "eliminates wavelength dispersion" used herein means cancellation of angular changes in optical paths on a wavelength band basis resulting from dispersion but does not necessarily require, for example, complete coincidence of the optical paths with one another on a wavelength band basis for restoration of initial optical paths.

In the light guide apparatus described above, the image extraction section has Fresnel-shaped reflection surfaces, whereby the thickness of the apparatus can be reduced. Further, since the dispersion elimination section for eliminating the wavelength dispersion is provided in correspondence with the image extraction section, image deterioration resulting from the dispersion (chromatic aberrations) on a wavelength band basis is suppressed, whereby the video light can be satisfactorily guided. In this process, since the reflection surfaces facing each other and extending in parallel to each other in the light guide section guide the video light, the angular relationship associated with the video light is maintained with no change between the image extraction section and the dispersion elimination section, whereby the wavelength dispersion that occurs in the dispersion elimination section can be reliably eliminated.

In a specific aspect of the invention, the dispersion elimination section is made of a material having the same refractive index of the image extraction section and has reflection surfaces inclining with respect to a surface on which the video light is incident by the same angle by which the Fresnel-shaped reflection surfaces of the image extraction section incline. In this case, the structural symmetry between the image extraction section and the dispersion elimination section cancels angular changes in the optical paths on a wavelength band basis resulting from light dispersion that could occur in the image extraction section and the dispersion elimination section. As a result, the wavelength dispersion can be eliminated.

In another aspect of the invention, the dispersion elimination section is made of, as the material having the same refractive index, a material having a refractive index a difference of which from the refractive index of the material of the image extraction section is smaller than 0.01. In this case, a situation in which the elimination of the wavelength dispersion is hindered due to the difference in refractive index between the materials can be avoided.

In still another aspect of the invention, the light incident section and the light exiting section are provided on one end side and another end side of a plate-shaped member that forms the light guide section, and the dispersion elimination section is provided on the side where the light incident section is present in such a way that the dispersion elimination section and the image extraction section, which is provided on the side where the light exiting section is present, are symmetrically arranged. In this case, the symmetric arrangement in which the image extraction section and the dispersion elimination section are provided on the side where the light exiting section is present and on the side where the light incident section is present respectively allows the elimination of the wavelength dispersion as a whole.

In still another aspect of the invention, the dispersion elimination section is so provided as to face a light incident surface which forms the light incident section and on which the video light is incident, the image extraction section is so provided as to face a light exiting surface which forms the light exiting section and through which the video light exits, and the dispersion elimination section and the image extraction section are disposed on a surface extended from a side surface of the light guide section that is one of the reflection surfaces of the light guide section that face each other and extend in parallel to each other. In this case, the highly symmetric arrangement of the dispersion elimination section and the image extraction section can be maintained, whereby the wavelength dispersion can be efficiently eliminated.

In still another aspect of the invention, in the image extraction section, the Fresnel-shaped reflection surfaces are formed of a plurality of prisms.

In still another aspect of the invention, the image extraction section is formed of a prism sheet attached onto a surface of a plate-shaped member that forms the light guide section. In this case, the image extraction section can be manufactured in a simple configuration in which the prism sheet is attached onto the surface.

In still another aspect of the invention, the dispersion elimination section is formed of a prism sheet having the same film thickness of the image extraction section. In this case, the passage of the video light in the dispersion elimination section and the passage of the video light in the image extraction section are allowed to be symmetric.

In still another aspect of the invention, the dispersion elimination section is formed of a single prism or a plurality of prisms. In this case, prisms of a variety of sizes can be used to manufacture the dispersion elimination section.

In still another aspect of the invention, the dispersion elimination section is formed of the same member that forms the image extraction section. In this case, the dispersion elimination section and the image extraction section can be readily manufactured. For example, a large prism sheet is manufactured, and two sheets are cut off the manufactured prism sheet and attached onto a surface of a plate-shaped member in such a way that symmetric reflection surfaces are formed. The dispersion elimination section and the image extraction section can thus be formed.

In still another aspect of the invention, the dispersion elimination section has the same refractive index of the image extraction section, and reflection surfaces of the dispersion elimination section and the reflection surfaces of the image extraction section are symmetric in terms of inclination angle and differ from each other in terms of size. In this case, the symmetry of the inclination angles allows reflection surfaces of a variety of sizes to be formed in the dispersion elimination section with the elimination of the wavelength dispersion maintained.

Instill another aspect of the invention, the image extraction section reflects multiple times one video light component incident on the Fresnel-shaped reflection surfaces, and the dispersion elimination section reflects the video light component the same number of times that the image extraction section reflects the video light component. In this case, the multiple reflection operations allow adjustment of the video light optical paths. Further, configuring the dispersion elimination section in such a way that each video light component is reflected the same number of times that the image extraction section reflects the video light component allows the symmetry between the reflection in the dispersion elimination section and the reflection in the image extraction section to be maintained.

In still another aspect of the invention, the image extraction section has a plurality of semi-transparent/reflective surfaces that transmit at least part of light incident thereon and allows at least part of the video light to pass at least once through the plurality of semi-transparent/reflective surfaces. In this case, the video light passes through the plurality of semi-transparent/reflective surfaces at least once and the number of passage depends on the angle at which the video light is incident on the image extraction section, and the components of the video light are allowed to exit from appropriate positions toward a viewer in accordance with the angle at which the components are incident on the image extraction section.

In still another aspect of the invention, the light exiting section causes the video light having been parallelized and incident on the light incident section to exit with the parallelized state maintained. In this case, in the light guide apparatus, the parallelized state of the video light fluxes can be maintained from the incidence of the video light to the exit thereof.

In still another aspect of the invention, the light guide section guides the video light acquired through the light incident section based on total reflection at first and second total reflection surfaces facing each other and extending in parallel to each other. In this case, the total reflection at the first and second total reflection surfaces allows the video light to be guided with high efficiency.

In still another aspect of the invention, in the image extraction section, each of the Fresnel-shaped reflection surfaces is a semi-transparent/reflective surface that partially reflects and transmits the video light from a video element and outside light. In this case, an outside image can be superimposed on an image formed by the video light to achieve a see-through state.

A virtual image display apparatus according to an aspect of the invention includes any of the light guide apparatuses described above, a video element that produces the video light, and a projection lens that causes the video light from the video element to be incident on the light guide apparatus. In this case, the virtual image display apparatus, which uses any of the light guide apparatus described above, can display a satisfactory image.

In a specific aspect of the invention, the projection lens parallelizes the video light from the video element and causes the video light to be incident on the light guide apparatus. In this case, the light guide apparatus guides parallelized video light.

In another aspect of the invention, the video element produces color video light. In this case, the virtual image display apparatus can display a color image in a satisfactory manner.

BRIEF DESCRIPTION OF THE DRAWINGS

The invention will be described with reference to the accompanying drawings, wherein like numbers reference like elements.

FIG. 1A is a plan view showing a virtual image display apparatus according to a first embodiment, and FIG. 1B is a front view of a light guide apparatus incorporated into the virtual image display apparatus.

FIG. 5A shows an example of the configuration for a verification experiment, FIG. 5E is a partial enlarged view of FIG. 5A, FIG. 5C conceptually shows a virtual image display apparatus using the configuration shown in FIG. 5A, and FIG. 5D shows elimination of wavelength dispersion in the example shown in FIG. 5A.

DESCRIPTION OF EXEMPLARY EMBODIMENTS

First Embodiment

Figure 2:
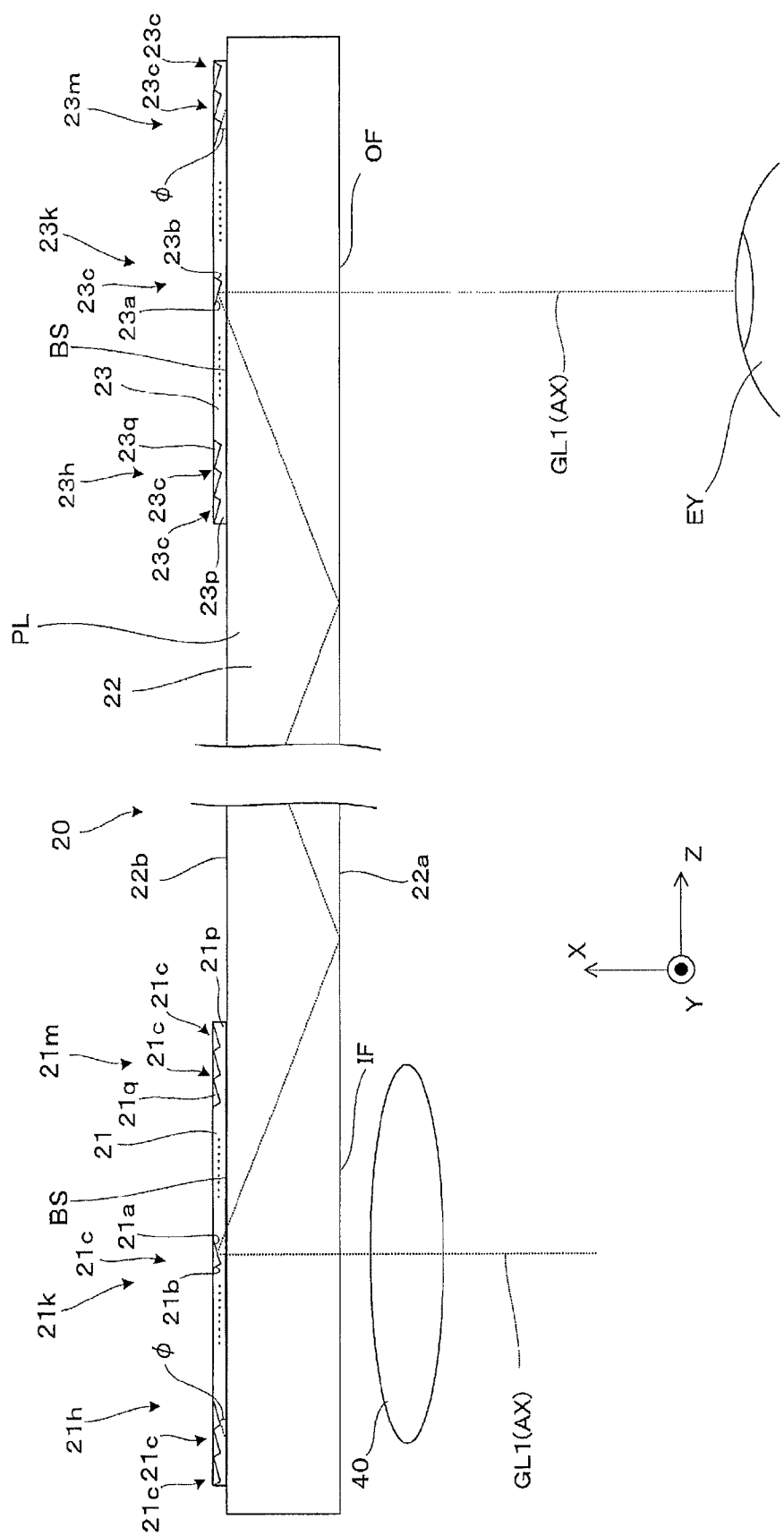
FIG. 2 is a cross-sectional view for describing the structure of the light guide apparatus.

A light guide apparatus for a virtual image display apparatus and a virtual image display apparatus into which the light guide apparatus is incorporated according to a first embodiment of the invention will be described below with reference to the drawings.

A light guide apparatus 20 incorporated into a virtual image display apparatus 100 according to the present embodiment shown in FIGS. 1A and 1B is a member for acquiring and guiding video light (image light) and outputting the video light toward a viewer and has a flat-plate-shaped exterior shape as a whole extending in one direction. The light guide apparatus 20 guides the entire video light flux in a Z direction, along which the flat plate extends. In the following description, the Z direction is called a light guide direction.

The virtual image display apparatus 100 according to the present embodiment will be described below with reference to FIG. 1A and other figures. The virtual image display apparatus 100 includes a set of a video display apparatus (video element) 10, a projection lens 40, and the light guide apparatus 20. FIG. 1A corresponds to the cross section A-A of the light guide apparatus 20 shown in FIG. 1B.

The virtual image display apparatus 100 allows the viewer to not only recognize the video light in the form of a virtual image but also view a see-through outside image. The video display apparatus 10, the projection lens 40, and the light guide apparatus 20 are typically provided as a set in correspondence with each of the viewer's right and left eyes, two sets in total. Since the two sets for the right and left eyes are bilaterally symmetric, only the set for the left eye is presented, and the set for the right eye is not shown. The exterior appearance of the virtual image display apparatus 100 as a whole (not shown) is, for example, the exterior appearance of typical glasses.

The video display apparatus 10 includes an illumination apparatus 31, which outputs two-dimensional illumination light, and a liquid crystal display device 32, which is a transmissive spatial light modulator, as shown in FIG. 1A. The liquid crystal display device 32 spatially modulates the illumination light from the illumination apparatus 31 to form color video light to be displayed, such as motion images, that is, light containing components that belong to a plurality of wavelength bands.

The projection lens 40 is a collimator lens that converts the video light outputted from each point on the liquid crystal display device 32 of the video display apparatus 10 into a parallelized light flux.

The structure of the light guide apparatus 20 will be described below. The light guide apparatus 20 is so formed as to have a light transmissive plate-shaped member PL as a main body section and further have a dispersion elimination section 21 and an image extraction section 23, each of which is formed, for example, by attaching a prism sheet or any other component onto a surface of the plate-shaped member PL, as shown in FIGS. 1A and 1B.

The light guide apparatus 20 includes a light incident section D1, a light guide section D2, and a light exiting section D3 as sections having optical functions, as shown in FIG. 1A. The light incident section D1 has a light incident surface IF and the dispersion elimination section 21, acquires the video light from the video display apparatus 10 through the light incident surface IF, and deflects the acquired video light toward the light guide section D2. That is, the light incident section D1 is a section having a function of acquiring the video light, which is a function in an optical sense. The light guide section D2 has a total reflection surface formation section 22 and causes the acquired video light to propagate toward the light exiting section D3. That is, the light guide section D2 is a section having a function of video light propagation, which is a function in an optical sense. The direction in which the light guide section D2 guides a light flux as a whole is called the light guide direction (Z direction in FIGS. 1A and 1B), as described above. The light exiting section D3 has the image extraction section 23, which is an angle converter, and a light exiting surface OF, angularly converts the video light having propagated through the light guide section D2 in the light guide direction, and causes the video light to exit through the light exiting surface OF. That is, the light exiting section D3 is a section having a function of extracting the video light, which is a function in an optical sense. As described above, the light incident section D1, the light guide section D2, and the light exiting section D3 are functional sections of the light guide apparatus 20 from an optical viewpoint.

The light incident section D1 has the light incident surface IF on a flat surface parallel to the YZ plane and facing the video display apparatus 10. The light incident section D1 further has the dispersion elimination section 21 on the opposite surface facing away from the light incident surface IF. The dispersion elimination section 21 is a sheet-shaped member having a large number of reflection surfaces, as described above. The dispersion elimination section 21, as will be described later, functions as a dispersion elimination member provided in a position where light dispersion that occurs in the image extraction section 23 should be handled and as a part of the light incident section D1, is also a member that functions as an angle converter (or incident light deflector) that deflects the video light incident through the light incident surface IF and traveling as a whole toward the +X-direction side in such a way that the video light travels as a whole toward the +Z-direction side but inclines toward the −X-direction side to guide the video light into the light guide section D2.

The light guide section D2 has the total reflection surface formation section 22, which extends from the light incident section D1, which is located on the entrance side, to the light exiting section D3, which is located on the far side, and guides the video light incident on the light guide section D2 to the image extraction section 23 of the light exiting section D3.

The total reflection surface formation section 22 has a first total reflection surface 22a and a second total reflection surface 22b, each of which totally reflects the video light, and the first and second total reflection surfaces 22a, 22b are flat-plate-shaped principal surfaces that function as the light guide section D2 and two flat surfaces facing each other and extending in parallel to the YZ plane. From a different point of view, the total reflection surface formation section 22 is a key part of the plate-shaped member PL, which is the main body section of the light guide apparatus 20. It is assumed in the description that the first total reflection surface 22a is closer to the video display apparatus 10 and the second total reflection surface 22b is farther from the video display apparatus 10.

The light exiting section D3 has the light exiting surface OF in a flat plane parallel to the YZ plane and facing the video display apparatus 10, that is, in the same plane in which the light incident surface IF of the light incident section D1 is present. The light exiting section D3 further has the image extraction section 23, which is a minute structure, on the opposite surface facing away from the light exiting surface OF. In other words, the image extraction section 23 is formed on the side beyond the total reflection surface formation section 22 (+Z side), along a flat surface extended from the second total reflection surface 22b, and close to the extended flat surface. The image extraction section 23 is a sheet-shaped member having a large number of reflection surfaces, as described above, and deflects the video light having traveled through the total reflection surface formation section 22 at a predetermined angle of reflection toward the light exiting surface OF with the parallelized state of the video light maintained.

In the thus configured light guide apparatus 20, since the first total reflection surface 22a of the light guide section D2, the light incident surface IF, and the light exiting surface OF form a common surface section, part or entirety of the light incident surface IF and the light exiting surface OF also functions as the light guide section D2, which guides the video light. That is, the function of the light guide section D2 is primarily achieved by the total reflection surface formation section 22, and the light incident surface IF of the light incident section D1 and the light exiting surface OF of the light exiting section D3 are also part of the light guide section D2. Video light GL reflected off the dispersion elimination section 21, which functions as the incident light deflector of the light incident section D1, is first incident on the first total reflection surface 22a and totally reflected. The video light is then incident on the second total reflection surface 22b and totally reflected. The video light GL repeatedly undergoes the total reflection described above and is guided to the far side of the light guide apparatus 20, that is, the +Z side where the image extraction section 23 is provided. It is assumed that the refractive index $n_a$ of a transparent resin material of which the light guide section D2 is made, that is, the plate-shaped member PL is, for example, at least 1.5. In other words, the transparent resin material is a high refractive index material. Use of a transparent resin material or a glass material having a relatively high refractive index as the material of the light guide apparatus 20 allows the video light to be readily guided through the light guide apparatus 20 and the viewing angle of the video light in the light guide apparatus 20 to be relatively small.

The dispersion elimination section 21 and the image extraction section 23 are provided on one end side (−Z side) of the plate-shaped member PL and on the other end side (+Z side) thereof, respectively, made of the same refractive material (material having refractive index $n_b$), and so formed as to have the same film thickness (thickness in X direction). Further, the inclination angles of a plurality of reflection surfaces provided in the dispersion elimination section 21 and the image extraction section 23 are symmetrically arranged. The structure in which the dispersion elimination section 21 and the image extraction section 23 have the symmetric arrangement, the same refractive index, and the symmetric inclination angles of the reflection surfaces avoids or suppresses image deterioration due to light dispersion that may occur when the video light GL passing through the light guide apparatus 20 is refracted at the interface between the plate-shaped member PL and the dispersion elimination section 21 and the interface between the plate-shaped member PL and the image extraction section 23. Further, in the arrangement of the dispersion elimination section 21 and the image extraction section 23 in the configuration described above, the dispersion elimination section 21 is so provided as to face the light incident surface IF of the light incident section D1, and the image extraction section 23 is so provided as to face the light exiting surface OF of the light exiting section D3. Further, as a result, in the case described above, the dispersion elimination section 21 and the image extraction section 23 are arranged on a surface extended from a side surface of the light guide section D2 (second total reflection surface 22b) that is one of the reflection surfaces of the light guide section D2 that face each other and extend in parallel to each other. As described above, the dispersion elimination section 21 and the image extraction section 23 are symmetrically arranged.

Among the components that form the light guide apparatus 20 according to the present embodiment, the structures of the dispersion elimination section 21 and the image extraction section 23 will be described below in detail with reference to FIG. 2 and other figures.

The structure of the image extraction section 23 will first be described. The image extraction section 23 has a shape such, as the shape of a Fresnel lens (such a shape is hereinafter referred to as a Fresnel shape) formed by arranging a plurality of prism-shaped members along a flat surface so that the Fresnel-shaped section has a plurality of reflection surfaces, as shown in FIG. 2. In other words, the image extraction section 23 has a first member 23p having the Fresnel shape and a second member 23q having a shape corresponding to the first member 23p with a large number of inclined surface sections 23c sandwiched between the first member 23p and the second member 23q so that the image extraction section 23 as a whole forms a flat sheet-shaped member (prism sheet). The large number of inclined surface sections 23c between the first member 23p and the second member 23q are formed of a large number of video light reflection surfaces 23a, which function as reflection surfaces for extracting the video light GL, and boundary sections 23b, which do not have the function as reflection surfaces for extracting the video light GL or other purposes but link the video light reflection surfaces 23a with each other. The direction in which the video light reflection surfaces 23a are arranged is the Z direction, in which the total reflection surface formation section 22 extends. Further, the video light reflection surfaces 23a are elongated surfaces extending in parallel to one another in the longitudinal direction thereof perpendicular to the Z direction, that is, in the Y direction (see FIG. 1B). Further, the large number of video light reflection surfaces 23a form the same angle φ with respect to the first and second total reflection surfaces 22a, 22b. Moreover, each of the video light reflection surfaces 23a is a semi-transparent/reflective surface that transmits part of the light components of the video light GL and reflects the remainder. The image extraction section 23 can therefore partially reflect and transmit the video light and the outside light to allow the viewer to view a see-through outside image. From a different point of view regarding the above description, the image extraction section 23 can also be considered in such a way that one video light reflection surface 23a and one boundary section 23b adjacent thereto are considered as a set of reflection unit and the set of reflection unit is cyclically repeated along the Z direction with the Y direction set as the longitudinal direction of the reflection unit so that a large number of reflection units as a whole form a single sawtooth cross-sectional section. In this case, since one inclined surface section 23c corresponds to one reflection unit, each of the inclined surface sections 23c is also referred to as a reflection unit 23c.

The structure of the dispersion elimination section 21 will next be described. The dispersion elimination section 21 has the same but symmetrically shaped members as those that form the image extraction section 23, as shown in FIG. 2. Specifically, the dispersion elimination section 21 has a plurality of prism-shaped members arranged along a flat surface so that a plurality of reflection surfaces are formed in the Fresnel-shaped section. In other words, the dispersion elimination section 21 has a first member 21p having the Fresnel shape and a second member 21q having a shape corresponding to the first member 21p with a large number of inclined surface sections (reflection units) 21c sandwiched between the first member 21p and the second member 21q so that the dispersion elimination section 21 as a whole forms a flat sheet-shaped member. The large number of inclined surface sections 21c between the first member 21p and the second member 21q are formed of a large number of video light reflection surfaces 21a, which function as reflection surfaces for deflecting the video light GL, and boundary sections 21b, which do not have the function as reflection surfaces for deflecting the video light GL or other purposes but link the video light reflection surfaces 21a with each other. The direction in which the video light reflection surfaces 21a are arranged is the Z direction, in which the total reflection surface formation section 22 extends. Further, the video light reflection surfaces 21a are elongated surfaces extending in parallel to one another in the longitudinal direction thereof perpendicular to the Z direction, that is, in the Y direction (see FIG. 1B). Further, the large number of video light reflection surfaces 21a form the same angle φ with respect to the first and second total reflection surfaces 22a, 22b. That is, each of the video light reflection surfaces 21a is inclined to the first and second total reflection surfaces 22a, 22b by the same degree by which the video light reflection surfaces 23a of the image extraction section 23 are inclined thereto. The orientation of the inclination of the video light reflection surfaces 21a of the dispersion elimination section 21 is, however, opposite the orientation of the inclination of the video light reflection surfaces 23a of the image extraction section 23, that is, the video light reflection surfaces 21a and the video light reflection surfaces 23a are inclined symmetrically with respect to the XY plane. In the following description, the state described above is referred to as a state in which the video light reflection surfaces 21a are inclined by the same angle by which the video light reflection surfaces 23a, which are Fresnel-shaped reflection surfaces, are inclined. Further, each of the video light reflection surfaces 21a is not a semi-transparent/reflective surface, unlike the video light reflection surfaces 23a, but is a reflection surface that specularly reflects the light components of the video light GL.

An example of how to manufacture the thus configured image extraction section 23 will be described. The first member 21p, which has a Fresnel shape (inclined surfaces having sawtooth-shaped cross-sectional shape) that should form the video light reflection surfaces 23a and the boundary sections 23b, is first formed in injection molding. A reflection film (for example, half-silvered film formed, for example, of dielectric multilayer film or metal film) that allows each of the inclined surfaces of the first member 21p to function as a reflection surface is then formed on the inclined surface. Lastly, the reflection films are buried with a resin material having the same refractive index of the first member 21p to form the second member 21q. A sheet-shaped member that should form the image extraction section 23 is thus manufactured. In this case, the configuration in which the first member 21p and the second member 21q have the same refractive index avoids image deterioration due to unintended refraction in the transmission and reflection of the video light at the video light reflection surfaces 23a. The sheet-shaped member formed as described above can be implemented in a variety of aspects. For example, it is conceivable that a large sheet-shaped member is manufactured and cut into pieces having an appropriate size and a cut piece is attached to the plate-shaped member PL to allow the combined structure to function as the image extraction section 23. The dispersion elimination section 21 can be manufactured in the same steps. In the configuration described above, however, to form a film that should form each of the video light reflection surfaces 21a, a mirror-surface film is formed, for example, in aluminum deposition.

As described above, the image extraction section 23 and the dispersion elimination section 21, which have a plurality of video light reflection surfaces 23a and video light reflection surfaces 21a, respectively, which are Fresnel-shaped reflection surfaces, allow the thickness of the light guide apparatus 20 to be reduced (thickness in X direction to be reduced) and hence allow the thickness and size of the virtual image display apparatus 100 to be reduced.

The optical path of the video light GL will be described below. Referring back to FIG. 1A, look at partial light fluxes that form the video light GL having exited out of the video display apparatus 10. Key components of the video light GL or video light fluxes GL1, GL2, and GL3, which are partial light fluxes parallelized when they pass through the projection lens 40, are incident through the light incident surface IF of the light guide apparatus 20 and are then repeatedly totally reflected off the first and second total reflection surfaces 22a, 22b at angles different from one another. Among the video light fluxes GL1, GL2, and GL3, the video light flux GL1 having exited out of a central portion of a light exiting surface 32a of the liquid crystal display device 32 is reflected off a central portion 21k of the dispersion elimination section 21, then travels through the total reflection surface formation section 22 and is reflected off a central portion 23k of the image extraction section 23, and exits through the light exiting surface OF with the state of the video light flux made parallel to the direction of an optical axis AX perpendicular to the light exiting surface OF maintained. The video light flux GL2 having exited out of one end side (+Z side) of the light exiting surface 32a of the liquid crystal device 32 is incident on the light incident surface IF at an angle $\theta_2$ with respect to the optical axis AX, is reflected off a peripheral portion 21m (+Z side) of the dispersion elimination section 21, then travels through the total reflection surface formation section 22 and is reflected off a peripheral portion 23m (+Z side), which is a portion of the image extraction section 23 and opposite the light incident surface side, and exits through the light exiting surface OF with the state of the video light flux made parallel to a direction inclined by a predetermined angle (direction inclined by $\theta_2$ with respect to optical axis AX) maintained. The video light flux GL3 having exited out of the other end side (−Z side) of the light exiting surface 32a of the liquid crystal device 32 is incident on the light incident surface IF at an angle $\theta_3$ with respect to the optical axis AX, is reflected off a peripheral portion 21h (−Z side) of the dispersion elimination section 21, then travels through the total reflection surface formation section 22 and is reflected off a peripheral portion 23h, which is a portion of the image extraction section 23 and closest to the light incident surface side (−Z side), and exits through the light exiting surface OF with the state of the video light flux made parallel to a direction inclined by a predetermined angle (direction inclined by $\theta_3$ with respect to optical axis AX) maintained. In this case, among the angles at which the video light fluxes GL1, GL2, and GL3 are totally reflected, the video light flux GL2 is totally reflected at a minimum angle, the video light flux GL3 is totally reflected at a maximum angle, and the other video light fluxes are totally reflected at intermediate angles between the maximum angle and the minimum angle.

Since the total reflection at the first and second total reflection surfaces 22a, 22b is performed at very high reflection efficiency, a decrease in luminance hardly occurs until the video light reaches the image extraction section 23. A video light flux GLy, which is a video light flux viewed along the vertical direction, that is, the Y direction, so passes through the light guide apparatus 20 as to converge as a whole, as shown in FIG. 1B.

Among the video light components, the video light flux GL2, which is totally reflected off the first and second total reflection surfaces 22a, 22b of the total reflection surface formation section 22 at the minimum angle of reflection, reaches the video light reflection surface 23a located on the farthest side (+Z side) in the peripheral portion 23m of the image extraction section 23, is reflected off the video light reflection surface 23a, exits at the angle $\theta_2$ with respect to the optical axis AX in the form of a parallelized light flux through the light exiting surface OF toward an eye EY, and is recognized by the viewer.

On the other hand, the video light flux GL3, which is totally reflected off the first and second total reflection surfaces 22a, 22b of the total reflection surface formation section 22 at the maximum angle of reflection, reaches the video light reflection surface 23a located on the side closest to the entrance side (−Z side) in the peripheral portion 23h of the image extraction section 23, is reflected off the video light reflection surface 23a, and exits at the angle $\theta_3$ with respect to the optical axis AX in the form of a parallelized light flux through the light exiting surface OF toward the eye EY.

The angle $\theta_2$ of the video light flux GL2 and the angle $\theta_3$ of the video light flux GL3 are roughly equal to each other but formed on opposite sides and correspond to the viewing angle of a virtual image formed by the video light. When the viewer recognizes a virtual image formed by parallelized light, as in the virtual image display apparatus 100 having the configuration described above, the viewer recognizes the position of the virtual image by the angle of the light incident on the eye EY. That is, it is very important to maintain the angle of each of the video light components, such as video light fluxes GL1 to GL3, at a desired value. The reason for this is that a change in the angle at which the video light is incident on the eye EY corresponds to a situation in which an image is recognized in a shifted wrong position.

In the video light guiding operation in the configuration of the light guide apparatus 20 described above, however, when the refractive index of one member differs from the refractive index of another member that is in contact therewith, dispersion (or chromatic aberrations) of the video light GL possibly occurs due to the difference in refractive index.

Figure 3:
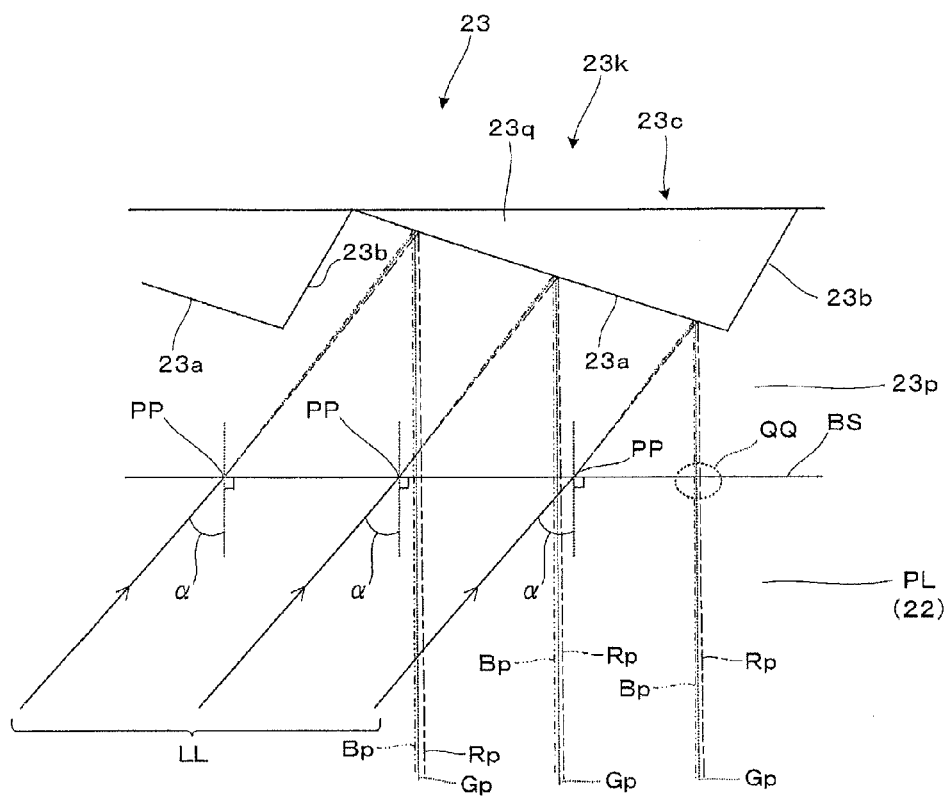
FIG. 3 describes how dispersion occurs.

FIG. 3 describes an example in which the dispersion occurs. Look at the boundary between the image extraction section 23 (refractive index $n_b$) and the plate-shaped member PL (refractive index $n_a$), and if parallelized light LL containing components that belong to different wavelength bands is incident on a boundary surface BS, which is an extension of the second total reflection surface 22b and a boundary between the image extraction section 23 and the plate-shaped member PL, at an angle of incidence a (that is, boundary surface BS is surface on which video light is incident), dispersion (color dispersion) occurs in accordance with the difference in refractive index ($n_a$-$n_b$), as shown in FIG. 3. That is, a component that belong to a shorter wavelength band is refracted by a greater amount at an incident position PP, resulting in color dispersion (color breakup). In other words, for example, when color video light GL containing components that belong to a plurality of wavelength bands is guided for color image projection, the optical paths of the color components contained in the video light GL (red light Rp, green light Gp, and blue light Bp in FIG. 3, for example) change differently in terms of angle. The difference in the change in the angle produces a difference in angle at which the video light component is incident on the viewer's eyes, undesirably resulting in a situation in which the viewer recognizes the difference in the angle as a shift in the position of the image. That is, color spotting and other defects occur. In the example shown in FIG. 3, since the parallelized light LL is reflected off the reflection surface 23a and then exits through the boundary surface BS roughly perpendicularly thereto, the dispersion resulting from the difference in refractive index hardly occurs at an exiting position QQ on the boundary surface BS. When the parallelized light LL is inclined to the boundary surface BS also at the exiting position QQ, however, a further change in the angles of the optical paths occurs. In the present embodiment, providing the dispersion elimination section 21 corresponding to the image extraction section 23 as described above suppresses image deterioration resulting from the dispersion (chromatic aberrations) on a wavelength band basis, such as the dispersion illustrated in FIG. 3, and therefore allows the video light to be satisfactorily guided.

Figures 4A, 4B:
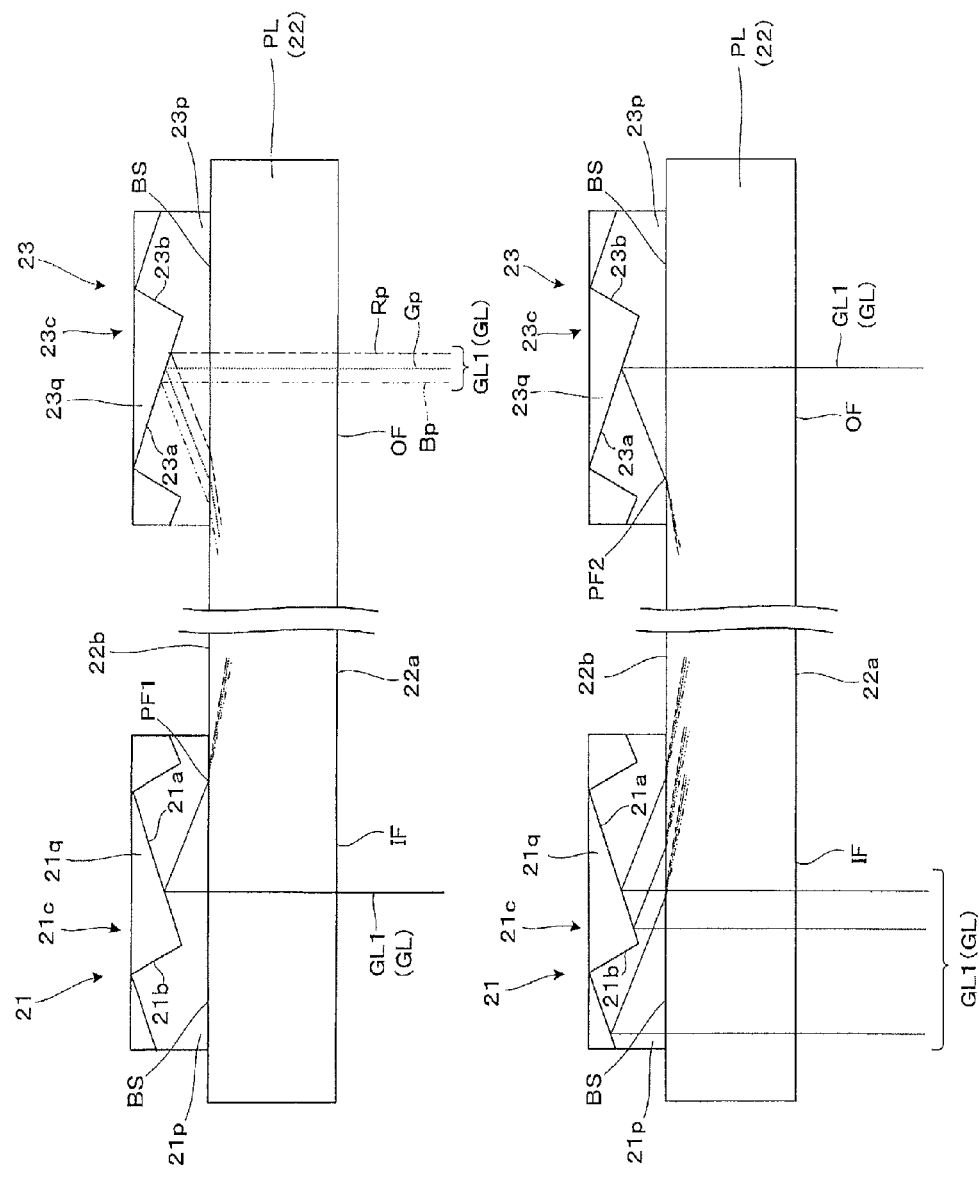
FIGS. 4A and 4B are conceptual diagrams for describing elimination of wavelength dispersion.

Elimination of the wavelength dispersion that occurs in the light guide apparatus 20 in the present embodiment will be described below with reference to FIGS. 4A and 4B and other figures. FIG. 4A conceptually shows the light guide apparatus 20 and is particularly an enlarged view of the reflection surfaces 21a and 23a of the dispersion elimination section 21 and the image extraction section 23. As shown in FIG. 4A, the video light GL (part of video light flux GL1, for example) is incident through the light incident surface IF, passes through the plate-shaped member, travels through the boundary surface BS, which is an extension of the second total reflection surface 22b and the boundary between the dispersion elimination section 21 and the plate-shaped member PL, and is incident on the dispersion elimination section 21 (that is, boundary surface BS is surface on which video light is incident), is reflected off the video light reflection surfaces 21a of the dispersion elimination section 21, travels again through the boundary surface BS, and is incident on the plate-shaped member PL (total reflection surface formation section 22). In this process, dispersion of the video light GL occurs due to the difference in refractive index ($n_a$-$n_b$) between the dispersion elimination section 21 (refractive index $n_b$) and the plate-shaped member PL (refractive index $n_a$), as in the case described with reference to FIG. 3. That is, the optical paths of the color light fluxes Rp, Gp, and Rp change differently in terms of angle. Further, the same difference in the angular change could occur between the image extraction section 23 (refractive index $n_b$) and the plate-shaped member PL (refractive index $n_a$). In contrast, in the present embodiment, the dispersion elimination section 21 and the image extraction section 23 are symmetrically arranged and have the same refractive index (refractive index $n_b$), and the inclination angles of the reflection surfaces 21a and 23a with respect to the second total reflection surface 22b are fixed at the same angle φ, as described above. Further, in the light guiding operation in the total reflection surface formation section 22, the total reflection is achieved by the first and second total reflection surfaces 22a, 22b facing each other and extending in parallel to each other, whereby the relationship among the angles is maintained. Therefore, in the video light GL having traveled through both the dispersion elimination section 21 and the image extraction section 23, the changes in the angles of the optical paths on a wavelength band basis resulting from the dispersion are canceled out. That is, the optical paths of the components of the video light GL that are incident at the same angle do not completely coincide with one another on a wavelength band basis due to the dispersion, but the angles at which the light fluxes exit are maintained so that the wavelength dispersion is eliminated, as in the case of the illustrated video light flux GL1. For example, in the case shown in FIG. 4A, which shows the color light fluxes Rp, Gp, and Bp, which are components of the video light GL and incident at the same angle at the same position PF1 on the light incident surface IF, the positions of the color light fluxes Rp, Gp, and Bp are slightly shifted from each other, but in the video light flux GL1, which is parallelized light (parallelized light flux) and contains components incident at the same angle (at right angles) on different positions over a certain width of the light incident surface IF, certain components may be incident on the same position PF2 on the boundary surface BS between the image extraction section 23 and the plate-shaped member PL in some cases, as shown, for example, in FIG. 4B. In these cases, the components exit in the form of a parallelized light flux through the light exiting surface OF toward the eye EY with the relationship among the post-incidence angles of the optical paths of the components maintained as described above.

It can be said from a different viewpoint of the configuration of the light guide apparatus 20 that the dispersion elimination section 21 functions to eliminate in advance light dispersion that may occur in the image extraction section 23.

As described above, in the present embodiment, the image extraction section 23 has a plurality of video light reflection surfaces 23a, which are Fresnel-shaped reflection surfaces, whereby the thickness of the light guide apparatus 20 and hence the thickness and size of the virtual image display apparatus 100 can be reduced. In particular, since the dispersion elimination section 21 for eliminating the wavelength dispersion is provided in correspondence with the image extraction section 23, image deterioration resulting from the dispersion (chromatic aberrations) on a wavelength band basis is suppressed, whereby the video light can be satisfactorily guided. Specifically, since the reflection surfaces (first and second total reflection surfaces 22a, 22b) facing each other and extending in parallel to each other in the light guide section D2 of the light guide apparatus 20 guide the video light GL, the angular relationship associated with the video light GL is maintained with no change between the image extraction section 23 and the dispersion elimination section 21, whereby the wavelength dispersion can be reliably eliminated by the dispersion elimination section 21.

In the above description, among the components of the video light GL parallelized and incident through the light incident surface IF, the video light flux GL1 incident at right angles has been described, but the other components have not been described. In the light guide apparatus 20 according to the present embodiment, for the components other than the video light flux GL1 that are obliquely incident on the light incident surface IF (video light fluxes GL2 and GL3, for example), the wavelength dispersion can be reliably eliminated by the dispersion elimination section 21. As described above, the video light flux GL2, for example, is incident at the angle $θ_2$ with respect to the optical axis AX, which is perpendicular to the light incident surface IF, and exits at the angle $θ_2$ with respect to the optical axis AX, which is perpendicular to the light exiting surface OF. Therefore, the effect of the refraction that occurs when the video light flux GL2 is incident on the light incident surface IF (refraction that occurs when video light flux GL2 is incident from air layer onto plate-shaped member PL (refractive index $n_a$)) is canceled by the effect of the refraction that occurs when the video light flux GL2 exits through the light exiting surface OF (refraction that occurs when video light flux GL2 is incident from plate-shaped member PL (refractive index $n_a$) onto air layer). The same holds true for the other components (such as video light flux GL3). That is, the wavelength dispersion can be reliably eliminated by the dispersion elimination section 21 over the entire video light GL.

An example of a verification experiment on the present embodiment will be described below. FIG. 5A shows an example of the configuration for the verification experiment. FIG. 5B is a partial enlargement view of FIG. 5A. FIG. 5C conceptually shows a virtual image display apparatus using the configuration shown in FIG. 5A. FIG. 5D shows elimination of the wavelength dispersion in the example shown in FIG. 5A. An experimental apparatus 100A shown in FIG. 5A includes a video display apparatus 10A, a projection lens 40A, and a light guide apparatus 20A, which have the same functions as those of the video display apparatus 10, the projection lens 40, and the light guide apparatus 20, which form the virtual image display apparatus 100 shown in FIGS. 1A and 1B and other figures, and generates, guides, and otherwise handles the video light GL. The light guide apparatus 20A has a dispersion elimination section 21 and an image extraction section 23 each having the same structure as that of the light guide apparatus 20. The symmetry between the dispersion elimination section 21 and the image extraction section 23 parallelizes and therefore eliminates wavelength dispersion that can occur, as shown in the partial enlarged view of FIG. 5B, whereby the video light GL is extracted in the form of image light to be eventually visually recognized. The experimental apparatus 100A further includes a focusing system 10 for focusing the video light GL having exited out of the light guide apparatus 20A. Among the components that form the experimental apparatus 100A, those excluding the focusing system 10 function as the virtual image display apparatus that forms light to be focused on the retina of the eye EY, as illustrated in FIG. 5C. That is, the focusing system 10 shown in FIG. 5A corresponds to a human's eye (lens), so to speak, and forms an image in an image formation position IP, which corresponds to the human's retina. FIG. 5D shows a real image formed in the image formation position IP, and the real image corresponds to the state of a virtual image to be visually recognized by the viewer in the configuration example shown in FIG. 5C. In this case, it is found that color spotting and other defects hardly occur but a satisfactory image is formed (on retina).

Figure 6A:
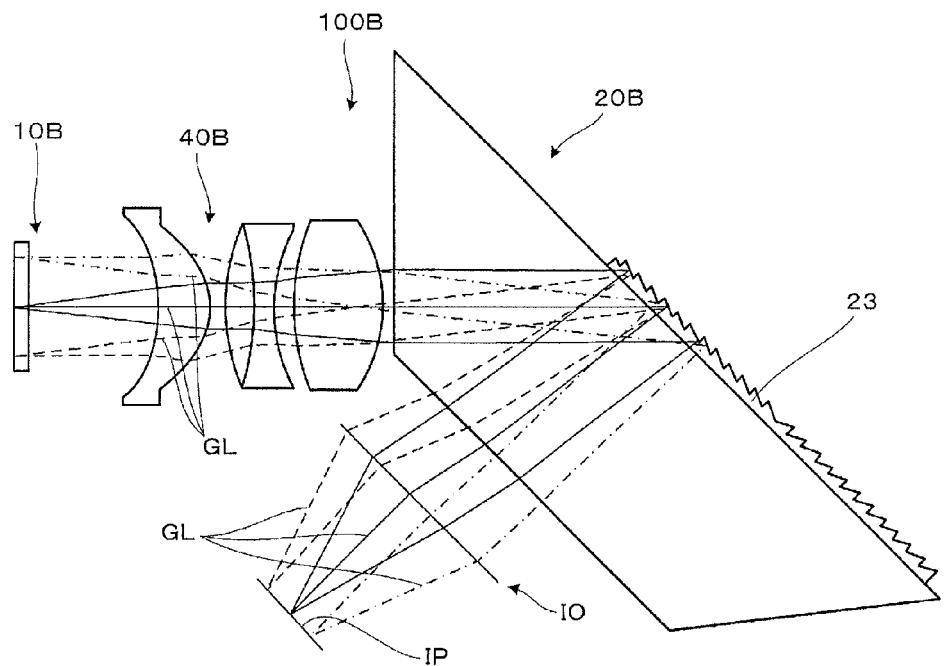
FIG. 6A shows a configuration example for comparison with the configuration example shown in FIG. 5A.
Figure 6B:
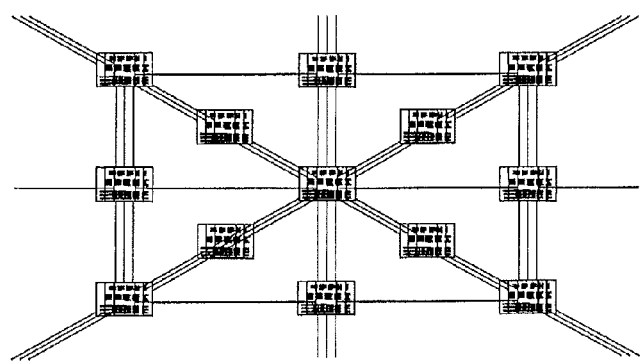
FIG. 6E shows color separation (color breakup) resulting from wavelength dispersion in the example shown in FIG. 6A.

On the other hand, FIG. 6A shows a configuration example for comparison with the configuration example shown in FIG. 5A, and FIG. 6B shows color separation (color breakup) resulting from wavelength dispersion in the example shown in FIG. 6A. An experimental apparatus 100B shown in FIG. 6A includes a video display apparatus 10B, a projection lens 40B, a light guide apparatus 20B, and a focusing system 10 but differs from the experimental apparatus 100A in that the light guide apparatus 20B includes no section corresponding to the dispersion elimination section but only includes the image extraction section 23. In this case, a real image formed in the image formation position IP has color spots and other defects, as shown in FIG. 6B.

The above verification shows that the dispersion elimination section 21 eliminates the color dispersion in the image extraction section 23.

A variation of the first embodiment will be described below with reference to FIGS. 7A and 7B. In the description, a variation of the image extraction section 23 is presented. That is, in the present variation, the light guide apparatus 20 has the same structure as that of the light guide apparatus 20 shown in FIG. 1A and other figures except the image extraction section 23, and the elements other than the image extraction section 23 will not therefore be described or otherwise explained. The image extraction section 23 in the present variation includes a large number of reflection units 23c including a large number of video light reflection surfaces 23a, each of which is a semi-transparent/reflective surface, and boundary sections 23b, which link the video light reflection surfaces 23a with each other, and causes at least part of the incident video light GL to pass at least once through the reflection units 23c (allows the reflection units 23c to transmit at least part of the incident video light GL at least once).

How the image extraction section 23 deflects the optical paths of the video light will be described below in more detail. The description will be made only of the deflection of the video light fluxes GL2 and GL3, which are components in the left and right peripheries, among the components of the video light GL, and the other intermediate components will not be described because they behave in the same manner as either of the video light fluxes GL2 and GL3.

Figure 7A:
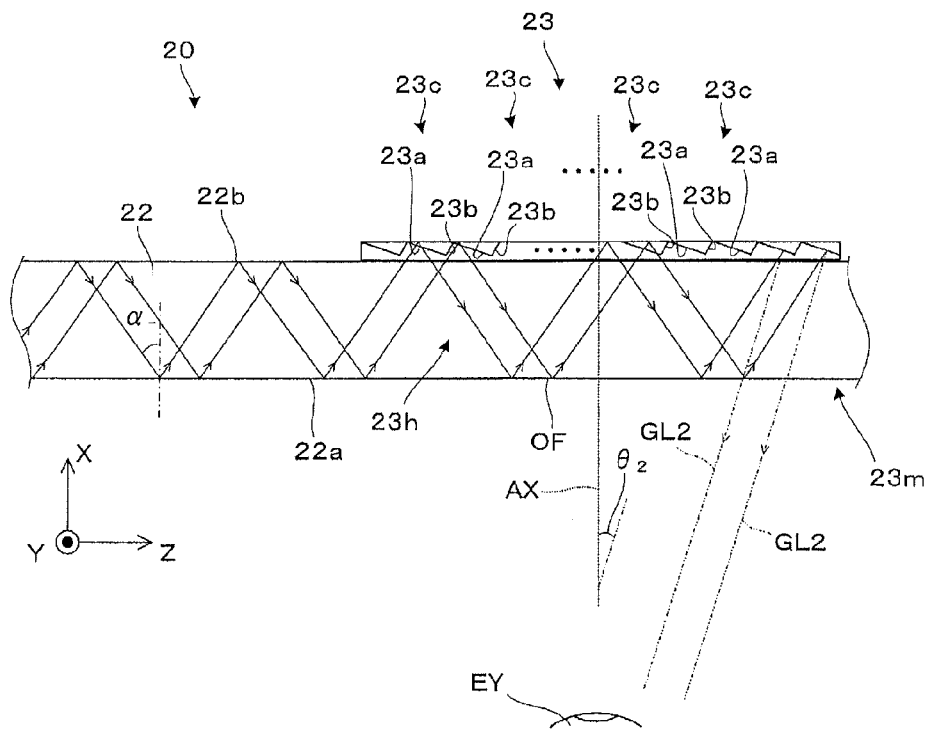
FIGS. 7A and 7B describe a variation of an image extraction section.

First, the video light flux GL2 totally reflected off the first and second total reflection surfaces 22a, 22b of the total reflection surface formation section 22 at a minimum angle of reflection α passes through the image extraction section 23 N times (N is natural number greater than 1), then reaches the video light reflection surface 23a located on the farthest side (+Z side) in the peripheral portion 23m of the image extraction section 23, is reflected off the video light reflection surface 23a, and exits in the form of a parallelized flux through the light exiting surface OF toward the eye EY at the angle $\theta_2$ with respect to the optical axis AX, which is the central axis of the eye EY, as shown in FIG. 7A. That is, a component reflected on the far side of the image extraction section 23, such as the video light flux GL2, passes through a large number of the video light reflection surfaces 23a N times, which is at least once, then reaches a predetermined video light reflection surface 23a that directs the component toward the eye EY, and is reflected off the predetermined video light reflection surface 23a to form an effective component, which is recognized by the viewer.

Figure 7B:
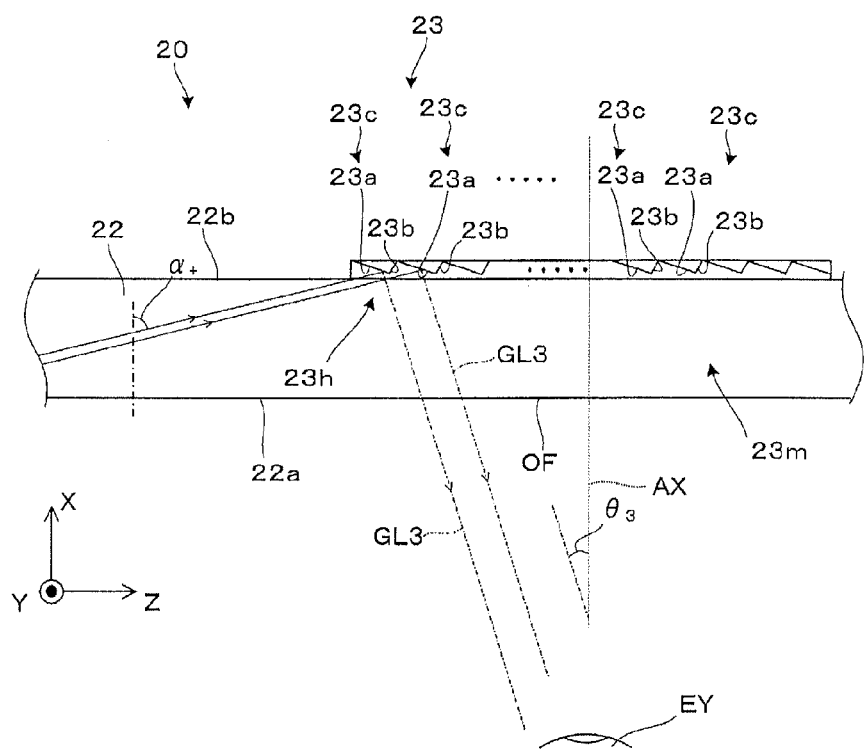

On the other hand, the video light flux GL3 totally reflected off the first and second total reflection surfaces 22a, 22b of the total reflection surface formation section 22 at a maximum angle of reflection α, reaches the video light reflection surface 23a located on the side closest to the entrance side (−Z side) in the peripheral portion 23h of the image extraction section 23, is reflected off the video light reflection surface 23a, and exits in the form of a parallelized flux through the light exiting surface OF toward the eye EY at the angle $\theta_3$ with respect to the optical axis AX, as shown in FIG. 7B.

Also in the present variation, the angular relationship associated with the video light GL is maintained with no change, and the wavelength dispersion can be reliably eliminated. Further, in this case, since the video light GL is allowed to pass through the image extraction section 23 (allows semi-transparent/reflective surfaces to transmit video light GL) at least once, a large viewing angle is achieved with the thickness of the apparatus maintained at a relatively small value irrespective of the situation in which the video light is guided at a relatively small angle of reflection and even when the video light is reflected off a video light reflection surface 23a located on the far side (+Z side) in the light guiding operation.

Figure 8A:
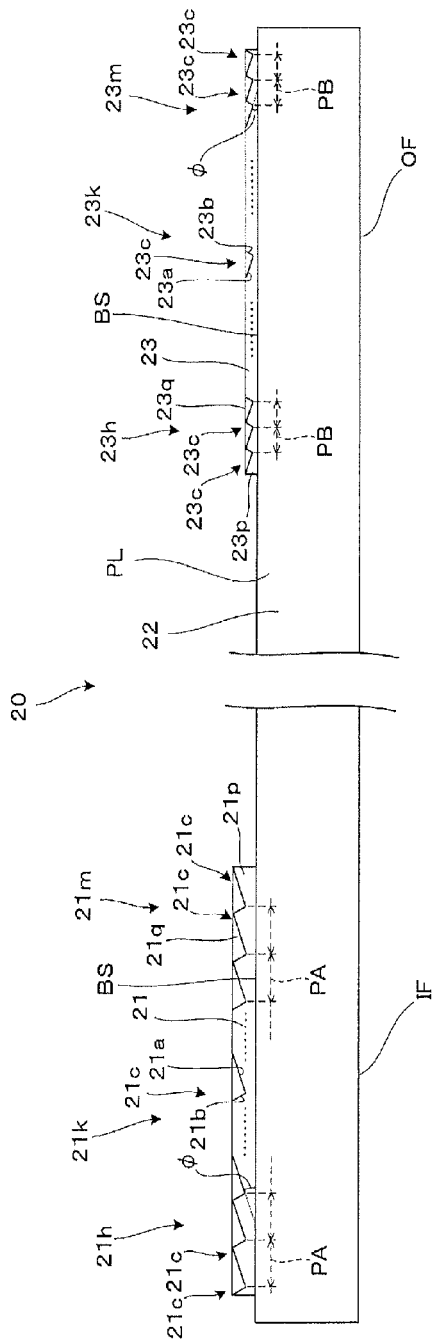
FIG. 8A describes a variation of a dispersion elimination section, and FIG. 8B describes a variation of the image extraction section.

Another variation of the first embodiment will be described below with reference to FIG. 8A. In the description, a variation of the dispersion elimination section 21 and the image extraction section 23 is presented. In the present variation, the light guide apparatus 20 has the same structure as that of the light guide apparatus 20 shown in FIG. 1A and other figures except relative structural differences in the image extraction section 23 and the dispersion elimination section 21 between the present variation and the first embodiment, and the elements other than the dispersion elimination section 21 and the image extraction section 23 will not therefore be described or otherwise explained. In the light guide apparatus 20 according to the present variation, the video light reflection surfaces 21a of the dispersion elimination section 21 and the video light reflection surfaces 23a of the image extraction section 23 are symmetric in terms of inclination angle and differ from each other in size, as shown in FIG. 8A. In other words, the inclination angles of the reflection surfaces 21a and 23a with respect to the second total reflection surface 22b are maintained at the same angle φ, but the reflection surfaces 21a differ from the reflection surfaces 23a in terms of size. In the example, shown in FIG. 8A, the transverse width PA of each of the reflection units 21c, which represents the size of each of the reflection surfaces 21a, is greater than the transverse width PB of each of the reflection units 23c, which represents the size of each of the reflection surfaces 23a. Also in this case, the symmetry of the optical paths of the video light fluxes is maintained, and the wavelength dispersion can be reliably eliminated.

Figure 8B:
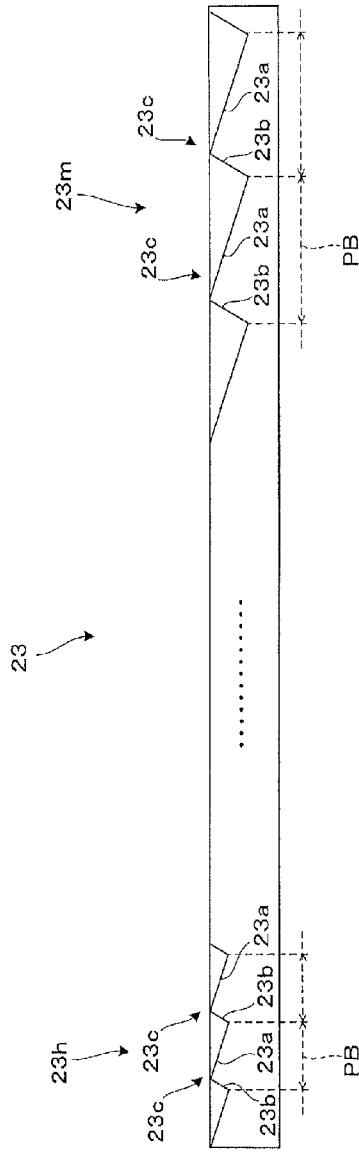

Still another variation is shown with reference to FIG. 8B. In the image extraction section 23, the sizes of a plurality of reflection surfaces 23a may vary with the inclination angles thereof maintained at the same angle φ. In the example shown in FIG. 8B, the reflection surface 23a located on the farther side (+Z side) in the light guiding operation has a greater size (greater transverse width PB of reflection unit 23c). Although not shown, the sizes of the plurality of reflection surfaces 21a of the dispersion elimination section 21 may similarly vary.

Second Embodiment

Figure 9:
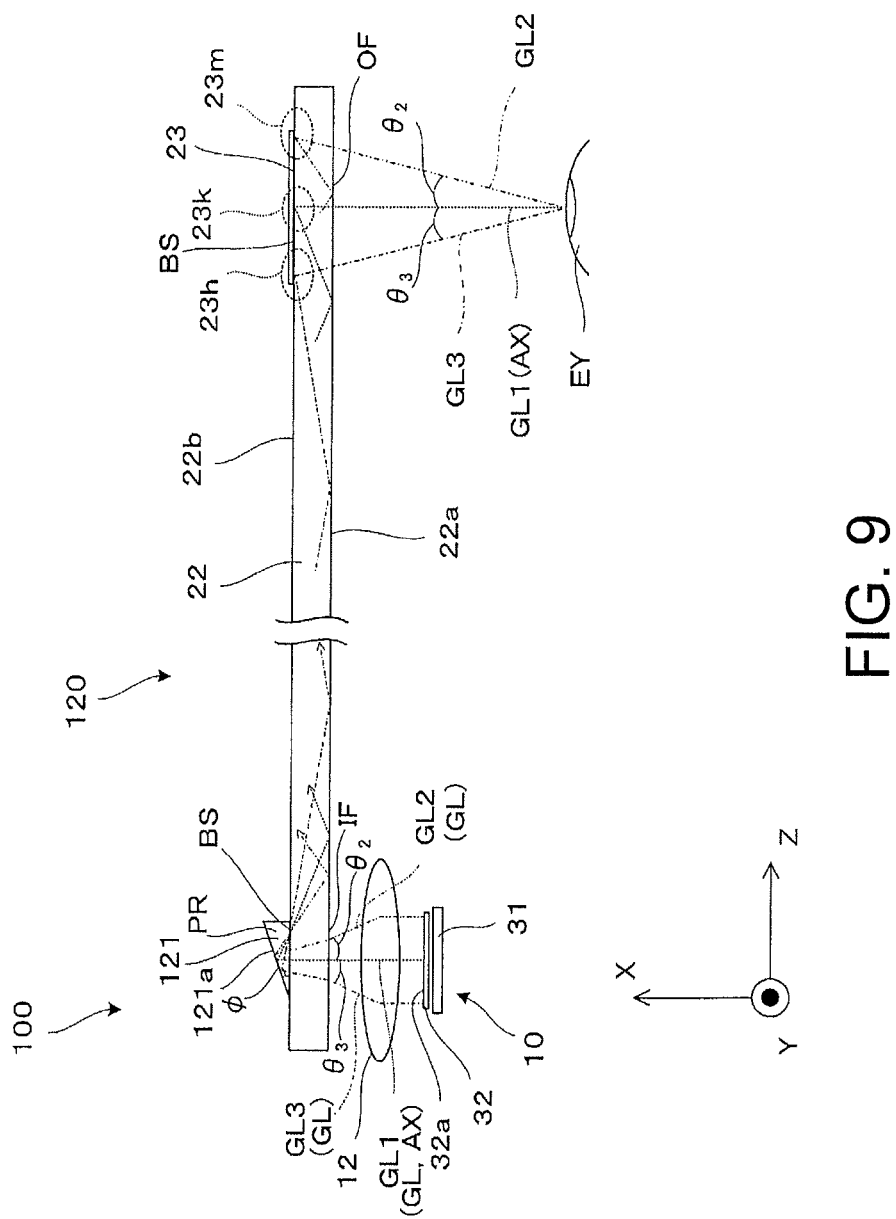
FIG. 9 is a plan view showing a virtual image display apparatus according to a second embodiment.

A second embodiment that is a variation of the first embodiment will be described below with reference to FIG. 9. A light guide apparatus 120, which is incorporated into a virtual image display apparatus 100 according to the present embodiment, includes a dispersion elimination section 121, which is formed of one (single) prism. The structures of the light guide apparatus 120 and the virtual image display apparatus 100 excluding the dispersion elimination section 121 are the same as the structures of the light guide apparatus 20 and the virtual image display apparatus 100 shown in FIG. 1A and other figures, and the elements in the same structures will not therefore be described or otherwise explained.

In the light guide apparatus 120 according to the present embodiment, the dispersion elimination section 121 is formed of a single prism PR, which has a triangular columnar shape extending in the Y direction. More specifically, first of all, the single prism PR is made of a material having the same refractive index of the image extraction section 23. Further, one side surface of the single prism PR having a triangular columnar shape is bonded to a surface extended from the second total reflection surface 22b to form the boundary surface BS, and a full-reflection mirror is formed on an inclined surface inclined by an angle with respect to the one side surface of the single prism PR so that the full-reflection mirror faces the one side surface with the angle $\phi$ therebetween, as shown in FIG. 9. A video light reflection surface 121a is thus formed. The thus configured dispersion elimination section 121 not only functions as a member so arranged that the dispersion elimination section 121 and the image extraction section 23 are symmetric in terms of the change in the video light optical path for dispersion elimination but also functions as an angle converter (or incident light deflector) that deflects (guides) the video light toward the light guide section.

Also in the present embodiment, the symmetry of the optical paths of the video light fluxes is maintained, whereby the wavelength dispersion can be reliably eliminated.

Third Embodiment

Figure 10:
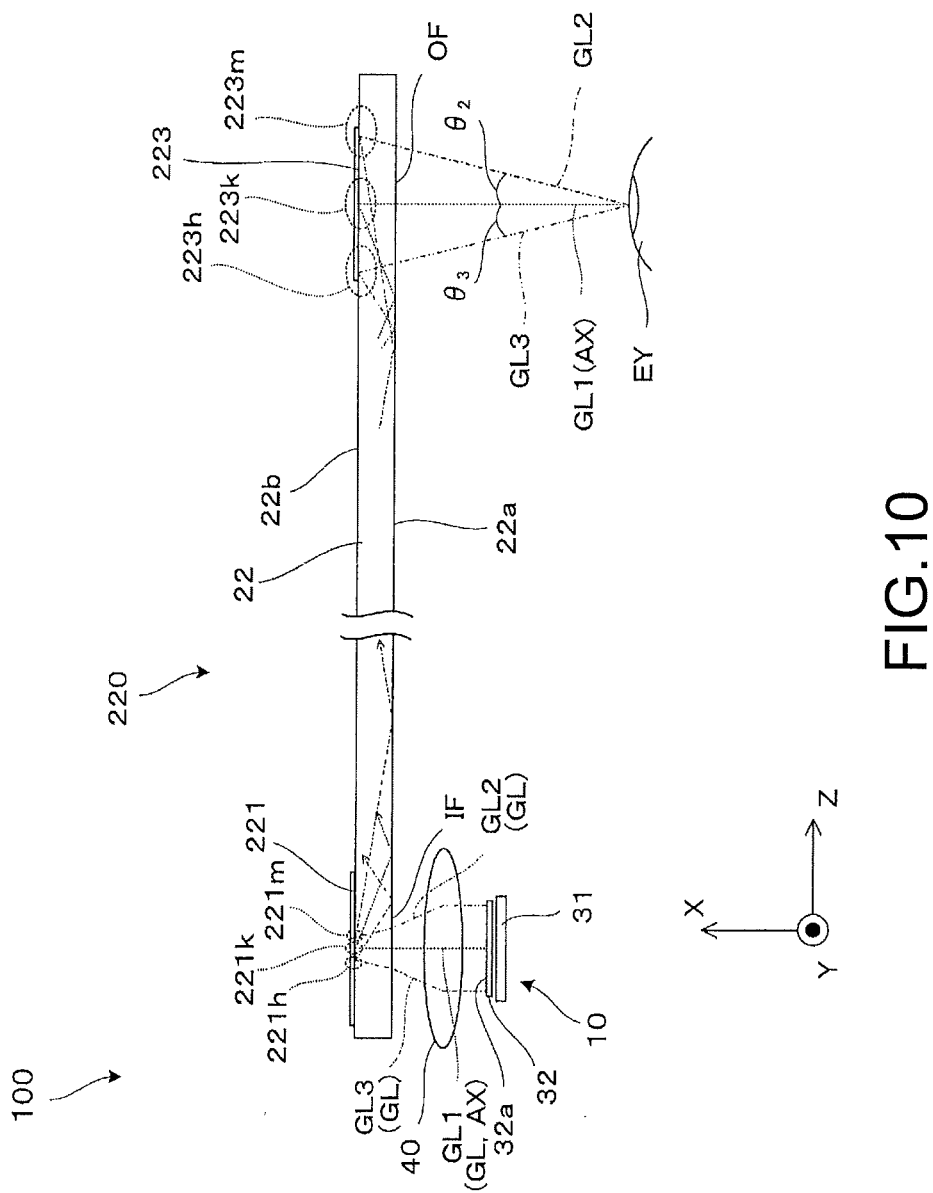
FIG. 10 is a plan view showing a virtual image display apparatus according to a third embodiment.
Figure 11A:
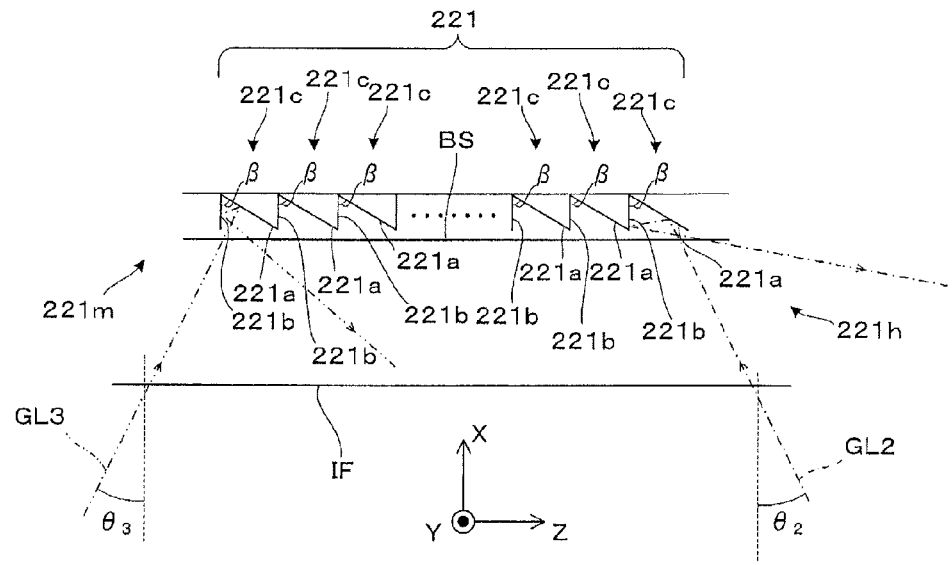
FIG. 11A describes the structure of a dispersion elimination section, and FIG. 11B describes the structure of an image extraction section.

A third embodiment that is a variation of the first embodiment or any other embodiment will be described below with reference to FIG. 10 and other figures. In a light guide apparatus 220 incorporated into a virtual image display apparatus 100 according to the present embodiment, each of a dispersion elimination section 221 and an image extraction section 223 has a structure in which one video light component incident on Fresnel-shaped reflection surfaces is reflected twice (multiple times), as shown in FIGS. 11A and 11E. The structures of the light guide apparatus 220 and the virtual image display apparatus 100 excluding the dispersion elimination section 221 and the image extraction section 223 are the same as the structures of the light guide apparatus 20 and the virtual image display apparatus 100 shown in FIG. 1A and other figures, and the elements in the same structures will not therefore be described or otherwise explained.

The optical paths of the video light fluxes will be described below. The video light fluxes GL1, GL2, and GL3, which are key components and have exited out of the projection lens 40, are incident through the light incident surface IF of the light guide apparatus 220 and then repeatedly totally reflected off the first and second total reflection surfaces 22a, 22b at angles of reflection different from one another, as shown in FIG. 10. Among the video light fluxes GL1, GL2, and GL3, the video light flux GL1 having exited out of a central portion of the light exiting surface 32a of the liquid crystal device 32 is reflected off a central portion 221k of the dispersion elimination portion 221, then travels through the total reflection surface formation section 22 and is reflected off a central section 223k of the image extraction section 223, and exits through the light exiting surface OF in the direction of the optical axis AX, which is perpendicular to the light exiting surface OF. The video light flux GL2 having exited out of one end side (+Z side) of the light exiting surface 32a of the liquid crystal device 32 is incident on the light incident surface IF at an angle $\theta_2$ with respect to the optical axis AX, is reflected off a peripheral portion 221m (+Z side) of the dispersion elimination section 221, then travels through the total reflection surface formation section 22 and is reflected off a peripheral portion 223m, which is a portion of the image extraction section 23 and opposite the light incident surface side (+Z side), and exits through the light exiting surface OF at a predetermined angle (in direction inclined by $\theta_2$ with respect to optical axis AX). The video light flux GL3 having exited out of the other end side (−Z side) of the light exiting surface 32a of the liquid crystal device 32 is incident on the light incident surface IF at an angle $\theta_3$ with respect to the optical axis AX, is reflected off a peripheral portion 221h (−Z side) of the dispersion elimination section 221, then travels through the total reflection surface formation section 22 and is reflected off a peripheral portion 223h, which is a portion of the image extraction section 223 and closest to the light incident surface side (−Z side), and exits through the light exiting surface OF at a predetermined angle (in direction inclined by $\theta_3$ with respect to optical axis AX). In the present embodiment, among the angles at which the video light fluxes GL1, GL2, and GL3 are totally reflected, the video light flux GL2 is totally reflected at a maximum angle and the video light flux GL3 is totally reflected at a minimum angle, unlike in the first embodiment described with reference to FIGS. 1A and 1B and other embodiments, and the other video light fluxes are totally reflected at intermediate angles between the maximum angle and the minimum angle. The reason for this is that the number of reflection operations in each of the dispersion elimination section 221 and the image extraction section 223 is twice, as will be described with reference to FIGS. 11A and 11B, which differs from the number of reflection operations (single reflection) in each of the dispersion elimination section 21 and the image extraction section 23 in the first embodiment.

Figure 11B:
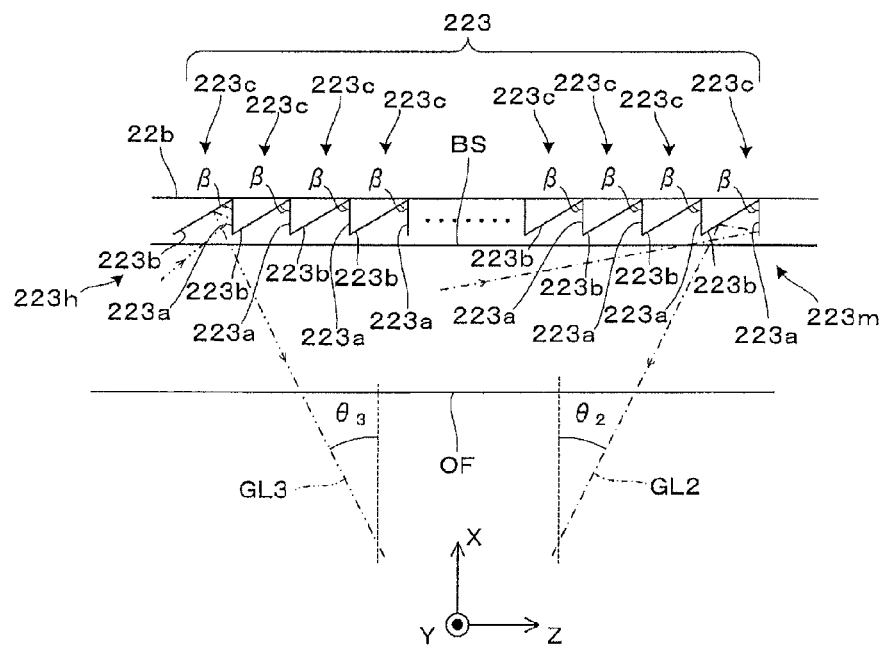

The structures of the dispersion elimination section 221 and the image extraction section 223 and how the dispersion elimination section 221 and the image extraction section 223 deflect the optical paths of the video light fluxes will be described below with reference to FIGS. 11A and 11B.

The structure of the dispersion elimination section 221 will first be described. The dispersion elimination section 221 is formed by arranging a large number of elongated reflection units 221c, which extends in the Y direction, in the Z direction, in which the total reflection surface formation section 22 extends, as shown in FIG. 11A. Each of the reflection units 221c has a set of a first reflection surface 221a, which is disposed on the far side, that is, on the +Z side, and a second reflection surface 221b, which is disposed on the entrance side, that is, on the −Z side. It is assumed that a relative angle $\beta$ between the first reflection surface 221a and the second reflection surface 221b is, for example, 54.7° in a specific example. It is further assumed that the second reflection surface 221b is perpendicular to the boundary surface BS, which is a surface extended from the second total reflection surface 22b, and that the first reflection surface 221a is inclined by the angle β with respect to the second reflection surface 221b.

How the dispersion elimination section 221 deflects the optical paths of the video light fluxes will be described below. In the description, among the video light fluxes, the video light fluxes GL2 and GL3 incident on the opposite end sides of the image extraction section 223 are presented, and the other optical paths will not be illustrated or otherwise described because they are deflected in the same manner.

First, the video light flux GL2, when it is incident through the boundary surface BS onto the peripheral portion 221m (+Z side) of the dispersion elimination section 221, is first reflected off the first reflection surface 221a of one of the reflection units 221c, then reflected off the second reflection surface 221b thereof, and guided by the total reflection in the total reflection surface formation section 22 without traveling via the other reflection units 221c. The video light flux GL3, when it is incident through the boundary surface BS onto the peripheral portion 221h (−Z side) of the dispersion elimination section 221, is first reflected off the first reflection surface 221a of one of the reflection units 221c, then reflected off the second reflection surface 221b thereof, and guided by the total reflection in the total reflection surface formation section 22 without traveling via the other reflection units 221c, as in the case of the video light flux GL2. On the first reflection surfaces 221a, which are inclined by the same angle, the video light flux GL2 is incident at the greatest angle of incidence, and the video light flux GL3 is incident at the smallest angle of incidence. The reason for this is that the twice-reflection structure changes the inclination direction as compared with the first embodiment (to be opposite the inclination direction in the first embodiment). Since the angle of reflection is thus configured, even after exiting through the boundary surface BS, the video light flux GL2 is totally reflected in the total reflection surface formation section 22 at a maximum angle of reflection, and the video light flux GL3 is totally reflected in the total reflection surface formation section 22 at a minimum angle of reflection.

The structure of the image extraction section 223 will next be described. The image extraction section 223 is formed by arranging a large number of elongated reflection units 223c, which extends in the Y direction, in the Z direction, in which the total reflection surface formation section 22 extends, as shown in FIG. 11B. Each of the reflection units 223c has a set of a first reflection surface 223a, which is disposed on the far side, that is, on the +Z side, and a second reflection surface 223b, which is disposed on the entrance side, that is, on the −Z side. It is assumed that a relative angle β between the first reflection surface 223a and the second reflection surface 223b is, for example, 54.7° in a specific example. It is further assumed that the first reflection surface 223a is perpendicular to the boundary surface BS, which is a surface extended from the second total reflection surface 22b, and that the second reflection surface 223b is inclined by the angle β with respect to the first reflection surface 223a. Out of the first reflection surface 223a and the second reflection surface 223b, at least the second reflection surface 223b is a semi-transparent/reflective surface that can transmit part of light and hence allows the viewer to view a see-through outside image.

How the image extraction section 223 deflects the optical paths of the video light fluxes will be described below. In the description, among the components of the video light GL, the video light fluxes GL2 and GL3 incident on the opposite end sides of the image extraction section 223 are presented, and the other optical paths will not be illustrated or otherwise described because they are deflected in the same manner.

First, the video light flux GL2, when it is incident through the boundary surface BS onto the peripheral portion 223m (+Z side) of the image extraction section 223, is first reflected off the first reflection surface 223a of one of the reflection units 223c, is then reflected off the second reflection surface 223b thereof, and exits through the light exiting surface OF without traveling via the other reflection units 223c. The video light flux GL3, when it is incident through the boundary surface BS onto the peripheral portion 223h (−Z side) of the image extraction section 223, is first reflected off the first reflection surface 223a of one of the reflection units 223c, then reflected off the second reflection surface 223b thereof, and guided by the total reflection in the total reflection surface formation section 22 without traveling via the other reflection units 223c, as in the case of the video light flux GL2. On the second reflection surfaces 223b, which are inclined by the same angle, the video light flux GL2 is incident at the greatest angle of incidence, and the video light flux GL3 is incident at the smallest angle of incidence. The reason for this is that the twice-reflection structure changes the inclination direction as compared with the first embodiment (to be opposite the inclination direction in the first embodiment).

Also in the present embodiment, in which each of the dispersion elimination section 221 and the image extraction section 223 reflects the video light twice (multiple times), the wavelength dispersion can be reliably eliminated because both the dispersion elimination section 221 and the image extraction section 223 reflect the video light components the same number of times (twice) and the symmetry of the video light optical paths is maintained.

Others

The invention has been described with reference to the embodiments, but the invention is not limited to the embodiments described above and can be implemented in a variety of other aspects to the extent that they do not depart from the substance of the invention. For example, the following variations are conceivable.

In the above description, the image extraction section is a sheet-shaped member, but the image extraction section is not limited thereto and may, for example, be formed by arranging a plurality of prisms.

In the above description, the see-through-type virtual image display apparatus has been described. When no outside image is required to be viewed, the video light reflection surfaces 23a, 123a and the first and second total reflection surfaces 223a, 223b can be so formed as to have light reflectance of about 100%.

The dispersion elimination section and the image extraction section may be formed of the same member. For example, in the configuration that does not allow see-through observation, each of the reflection surfaces 21a of the dispersion elimination section 21 and each of the reflection surfaces 23a of the image extraction section 23 may be formed of the same member that is a full-reflection mirror formed, for example, by aluminum deposition. Use of the same member allows the dispersion elimination section and the image extraction section to be readily manufactured. More specifically, for example, a large prism sheet is manufactured, and two sheets are cut off the manufactured prism sheet and attached onto a surface of a plate-shaped member (member that should form plate-shaped member PL) in such away that symmetric reflection surfaces are formed. The dispersion elimination section and the image extraction section can thus be formed. Instead, the dispersion elimination section and the image extraction section may be partially formed of the same member. For example, only the Fresnel-shaped sections of the dispersion elimination section and the image extraction section may be made of a common material. More specifically, for example, the first members 21p, 23p and the second members 21q, 23q may be manufactured at the same time, and the reflection films (reflection surfaces) may be formed separately. As a result, for example, in a case where the dispersion elimination section and the image extraction section are manufactured in resin molding, product-to-product variation in refractive index can be minimized, and the sheet-shaped member can be so manufactured that a mirror reflection surface is formed on the portion used as the dispersion elimination section and a semi-transparent/reflective surface is formed in the portion used as the image extraction section.

In the above description, the configuration in which the dispersion elimination section 21 and the image extraction section 23 have the same refractive index may include, although depending on the required resolution, not only a configuration in which they have the identical refractive index in an exact sense but also a configuration in which the refractive indices are roughly equal to each other, for example, equal to each other down to about the second digit after the decimal point (difference in refractive index is smaller than 0.01). In this case, the refractive indices of the materials of the two sections can be considered to be equal to each other, for example, when the refractive index n of one of the materials is 1.5178, and the refractive index of the other material is equal to the refractive index n down to the second digit after the decimal point (1.51). It is further desirably conceivable to employ a configuration in which the refractive indices are equal to each other down to the third digit after the decimal point (refractive indices are equal to each other down to 1.517 in the case described above) (difference in refractive index is smaller than 0.001).

When each of the dispersion elimination section 21 and the image extraction section 23 is manufactured by attaching a prism-sheet-shaped member with an adhesive, it is desirable to use an adhesive having a refractive index that is not very different from the refractive indices of the two sections. For example, it is preferable to use an adhesive having a refractive index difference roughly equal to the refractive index difference between the materials of the two sections described above (second or even third digit after decimal point). Further, the prism sheet is preferably not very thick from a viewpoint of suppression of dispersion, but too thin a prism sheet could produce wrinkles or other defects when it is attached. It is therefore desirable to set the thickness to be, for example, at least about several tens of micrometers (20 μm).

In the above description, the transmissive liquid crystal display device 32 is used as a video display element, and a variety of other display elements can be used as the image display element in place of a transmissive liquid crystal device. For example, a configuration using a reflective liquid crystal panel is also conceivable, and a digital micromirror device or any other similar device can be used in place of the liquid crystal display device 32. Instead, a configuration using a self-luminous element, representative example of which include an LED array and an OLED (organic EL), is also conceivable. Further, a configuration using a laser scanner that is a combination of a laser light source and a polygonal mirror or any other scanner is also conceivable.

The luminance pattern of the liquid crystal display device 32 and the light source thereof can be adjusted in consideration of the light extraction characteristic of the image extraction section 23.

In the above description, the virtual image display apparatus 100 includes two sets of the video display apparatus 10 and the light guide apparatus 20 in correspondence with the right and left eyes, and a configuration in which only one of the right and left eyes is provided with the video display apparatus 10 and the light guide apparatus 20 may be employed for monocular view of an image. The light guide apparatus 20 according to any of the embodiments has been specifically described above with reference to the case where the virtual image display apparatus 100 is a head mounted display, and the virtual image display apparatus 100 according to any of the embodiments may be a head-up display and the light guide apparatus 20 may be used therewith.

In the above description, each of the first and second total reflection surfaces 22a, 22b does not have a mirror, a half-silvered mirror, or any other optical component provided thereon but totally reflects video light off the interface with air and guides the video light, but the total reflection in the invention of the present application includes reflection performed by a mirror coating or a half-silvered mirror formed on the entirety or part of each of the first and second total reflection surfaces 22a, 22b. For example, the total reflection in the invention of the present application also includes a case where the angle of incidence of video light satisfies the total reflection condition and the entirety or part of each of the total reflection surfaces 22a and 22b is provided with a mirror coating or any other optical component and therefore reflects substantially the entire video light. Further, when sufficiently bright video light is provided, the entirety or part of each of the total reflection surfaces 22a and 22b may be coated with a mirror that is transmissive to some extent.

The entire disclosure of Japanese Patent Application No. 2015-162513, filed Aug. 20, 2015 is expressly incorporated by reference herein.

What is claimed is:

1. A light guide apparatus comprising:
   a light incident section on which video light is incident;
   a light guide section that has reflection surfaces facing each other and extending in parallel to each other and reflects and guides the video light acquired through the light incident section;
   a light exiting section that causes the video light guided by the light guide section to exit;
   an image extraction section that is provided on the light exiting section and includes Fresnel-shaped reflection surfaces that deflect the video light from the light guide section to extract the video light out of the apparatus; and
   a dispersion elimination section that is provided in correspondence with the image extraction section and eliminates wavelength dispersion that occurs in the image extraction section.

2. The light guide apparatus according to claim 1, wherein the dispersion elimination section is made of a material having the same refractive index of the image extraction section and has reflection surfaces inclining with respect to a surface on which the video light is incident by the same angle by which the Fresnel-shaped reflection surfaces of the image extraction section incline.

3. The light guide apparatus according to claim 2,
wherein the dispersion elimination section is made of, as the material having the same refractive index, a material having a refractive index a difference of which from the refractive index of the material of the image extraction section is smaller than 0.01.

4. A virtual image display apparatus comprising:
the light guide apparatus according to claim 3;
a video element that produces the video light; and
a projection lens that causes the video light from the video element to be incident on the light guide apparatus.

5. A virtual image display apparatus comprising:
the light guide apparatus according to claim 2;
a video element that produces the video light; and
a projection lens that causes the video light from the video element to be incident on the light guide apparatus.

6. The light guide apparatus according to claim 1,
wherein the light incident section and the light exiting section are provided on one end side and another end side of a plate-shaped member that forms the light guide section, and
the dispersion elimination section is provided on the side where the light incident section is present in such a way that the dispersion elimination section and the image extraction section, which is provided on the side where the light exiting section is present, are symmetrically arranged.

7. The light guide apparatus according to claim 6,
wherein the dispersion elimination section is so provided as to face a light incident surface which forms the light incident section and on which the video light is incident,
the image extraction section is so provided as to face a light exiting surface which forms the light exiting section and through which the video light exits, and
the dispersion elimination section and the image extraction section are disposed on a surface extended from a side surface of the light guide section that is one of the reflection surfaces of the light guide section that face each other and extend in parallel to each other.

8. The light guide apparatus according to claim 1,
wherein in the image extraction section, the Fresnel-shaped reflection surfaces are formed of a plurality of prisms.

9. The light guide apparatus according to claim 1,
wherein the image extraction section is formed of a prism sheet attached onto a surface of a plate-shaped member that forms the light guide section.

10. The light guide apparatus according to claim 9,
wherein the dispersion elimination section is formed of a prism sheet having the same film thickness of the image extraction section.

11. The light guide apparatus according to claim 1,
wherein the dispersion elimination section is formed of the same member that forms the image extraction section.

12. The light guide apparatus according to claim 1,
wherein the dispersion elimination section has the same refractive index of the image extraction section, and
reflection surfaces of the dispersion elimination section and the reflection surfaces of the image extraction section are symmetric in terms of inclination angle and differ from each other in terms of size.

13. The light guide apparatus according to claim 1,
wherein the image extraction section reflects multiple times one video light component incident on the Fresnel-shaped reflection surfaces, and
the dispersion elimination section reflects the video light component the same number of times that the image extraction section reflects the video light component.

14. The light guide apparatus according to claim 1,
wherein the image extraction section has a plurality of semi-transparent/reflective surfaces that transmit at least part of light incident thereon and allows at least part of the video light to pass at least once through the plurality of semi-transparent/reflective surfaces.

15. The light guide apparatus according to claim 1,
wherein the light exiting section causes the video light having been parallelized and incident on the light incident section to exit with the parallelized state maintained.

16. The light guide apparatus according to claim 1,
wherein the light guide section guides the video light acquired through the light incident section based on total reflection at first and second total reflection surfaces facing each other and extending in parallel to each other.

17. The light guide apparatus according to claim 1,
wherein in the image extraction section, each of the Fresnel-shaped reflection surfaces is a semi-transparent/reflective surface that partially reflects and transmits the video light from a video element and outside light.

18. A virtual image display apparatus comprising:
the light guide apparatus according to claim 1;
a video element that produces the video light; and
a projection lens that causes the video light from the video element to be incident on the light guide apparatus.

19. The virtual image display apparatus according to claim 18,
wherein the projection lens parallelizes the video light from the video element and causes the video light to be incident on the light guide apparatus.

20. The virtual image display apparatus according to claim 18,
wherein the video element produces color video light.

* * * * *